United States Patent
Ihrke et al.

(10) Patent No.: US 8,371,177 B2
(45) Date of Patent: Feb. 12, 2013

(54) TENDON TENSION SENSOR

(75) Inventors: Chris A. Ihrke, Hartland, MI (US);
Lyndon Bridgwater, Houston, TX (US);
Robert Platt, Houston, TX (US)

(73) Assignees: GM Global Technology Operations LLC, Detroit, MI (US); The United States of America as represented by the Administrator of the National Aeronautics and Space Administration, Washington, DC (US)

(*) Notice: Subject to any disclaimer, the term of this patent is extended or adjusted under 35 U.S.C. 154(b) by 1170 days.

(21) Appl. No.: 12/241,309

(22) Filed: Sep. 30, 2008

(65) Prior Publication Data
US 2010/0081969 A1   Apr. 1, 2010

(51) Int. Cl.
*G01B 5/30* (2006.01)
(52) U.S. Cl. .............................. 73/760; 73/826
(58) Field of Classification Search .............. 73/760, 73/795, 826, 831, 759, 158
See application file for complete search history.

(56) References Cited

U.S. PATENT DOCUMENTS

| | | | | |
|---|---|---|---|---|
| 4,005,828 A | * | 2/1977 | Peszeszer | 242/438.1 |
| 4,361,199 A | * | 11/1982 | Ulicny | 177/154 |
| 4,648,224 A | * | 3/1987 | Kitta et al. | 52/223.14 |
| 4,974,451 A | * | 12/1990 | DeTeresa | 73/821 |
| 5,004,391 A | * | 4/1991 | Burdea | 414/6 |
| 5,316,017 A | * | 5/1994 | Edwards et al. | 600/595 |
| 5,484,389 A | * | 1/1996 | Stark et al. | 601/34 |
| 8,056,423 B2 | * | 11/2011 | Abdallah et al. | 73/826 |
| 2002/0029045 A1 | * | 3/2002 | Bonutti | 606/86 |
| 2003/0103813 A1 | * | 6/2003 | Pollack | 405/224 |
| 2006/0201083 A1 | * | 9/2006 | Hayes et al. | 52/223.13 |

* cited by examiner

*Primary Examiner* — Max Noori
(74) *Attorney, Agent, or Firm* — John A. Miller; Miller IP Group, PLC

(57) ABSTRACT

A tendon tension sensor that has particular application for measuring tension on a tendon employed in a robotic arm. The tension sensor includes an elastic element having a curved channel through which the tendon is threaded. The elastic element also includes a center portion on which strain gauges are mounted that measure the strain on the elastic element. Tension on the tendon causes the center portion of the elastic element to flex or bend, which is measured by the strain gauges providing an indication of the tension in the tendon.

20 Claims, 3 Drawing Sheets

TENDON TENSION SENSOR

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefor.

BACKGROUND OF THE INVENTION

1. Field of the Invention

This invention relates generally to a tendon tension sensor and, more particularly, to a tension sensor for a tendon in a robotic arm where the sensor employs an elastic element through which the tendon is threaded and strain gauges mounted to the elastic element that measure the bending of the elastic element in response to tension on the tendon.

2. Discussion of the Related Art

Dexterous robot systems are known in the art that perform a variety of functions. A dexterous robot system typically includes a robotic arm having fingers and related joints that operate to grasp an object or part for a particular application. In a particular dexterous robot system design, tendons are employed to actuate the fingers where the tendons are coupled to the finger joints. The tension in the tendons provides an indication of the external loads experienced by the fingers. Thus, it is desirable to measure the tension in the tendon to provide a measurement of the load on the fingers.

One known technique for measuring the tension in a robotic tendon employs a strain gauge sensor for measuring the tensile deformation of the tendon. However, the range of tensile forces that are encountered in robotic applications may be so small that strain gauge sensors may not be sensitive enough to provide an accurate measurement.

It is also known in the art to use load cells to measure tension. However, commercially available load cells typically are too large for robotic applications in that they cannot be adequately housed inside of a robotic arm.

Another known design employs an S-shaped elastic element on which a strain gauge is mounted. An end of a tendon is coupled to one end of the S-shaped element and an end of another tendon is coupled to an opposite end of the S-shaped element so that tension on the tendon cause the S-shaped element to deform. This design requires cutting of the tendon and has a relatively large diameter.

SUMMARY OF THE INVENTION

In accordance with the teachings of the present invention, a tendon tension sensor is disclosed that has particular application for measuring tension on a tendon employed in a robotic arm. The tension sensor includes an elastic element having a curved channel through which the tendon is threaded. The elastic element also includes a center portion on which strain gauges are mounted that measure the strain on the elastic element. Tension on the tendon causes the center portion of the elastic element to flex or bend, which is measured by the strain gauges providing an indication of the tension in the tendon.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a tendon tension sensor is merely exemplary in nature, and is in no way intended to limit the invention or its applications or uses. For example, the tendon tension sensor of the invention has particular application for measuring the tension of a tendon in a robotic arm. However, as will be appreciated by those skilled in the art, the tendon tension sensor of the invention has application for measuring the tension in other types of tendons.

Figure 1:
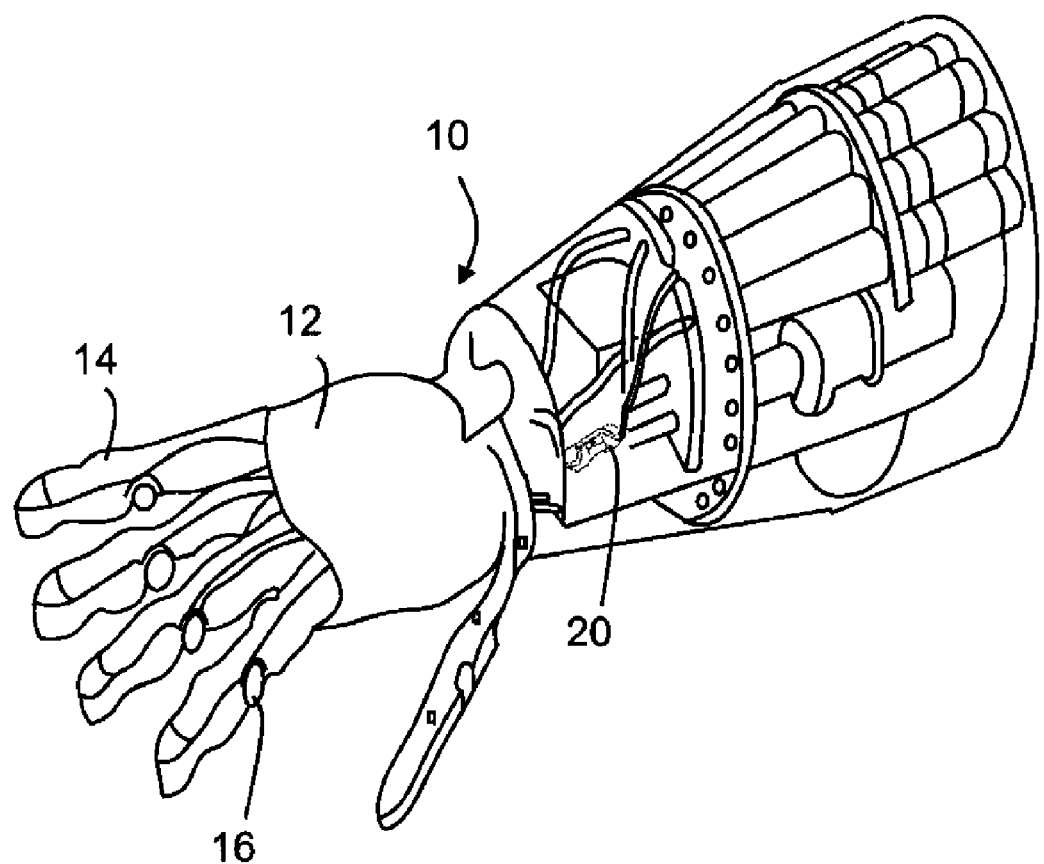
FIG. 1 is an illustration of a robotic arm including jointed fingers controlled by tendons and including a tendon tension sensor.

FIG. 1 is an illustration of a robotic arm 10 including a hand 12 having a plurality of fingers 14. The robotic arm 10 is the type of robotic arm typically used in dexterous robot systems. Each of the fingers 14 includes a joint 16 that allows the fingers 14 to grasp a particular object depending on the particular application. In order to allow the joints 16 to be actuated to close and open the fingers 14, tendons 18 are coupled to the joints 16 where a pulling force on the tendons 18 causes the fingers 14 to close. As discussed above, it is desirable to measure the tension on the tendons 18 so that the force applied to the object being grasped by the fingers 12 is known. In order to provide this measurement, the present invention proposes a tendon tension sensor 20.

Figure 2:
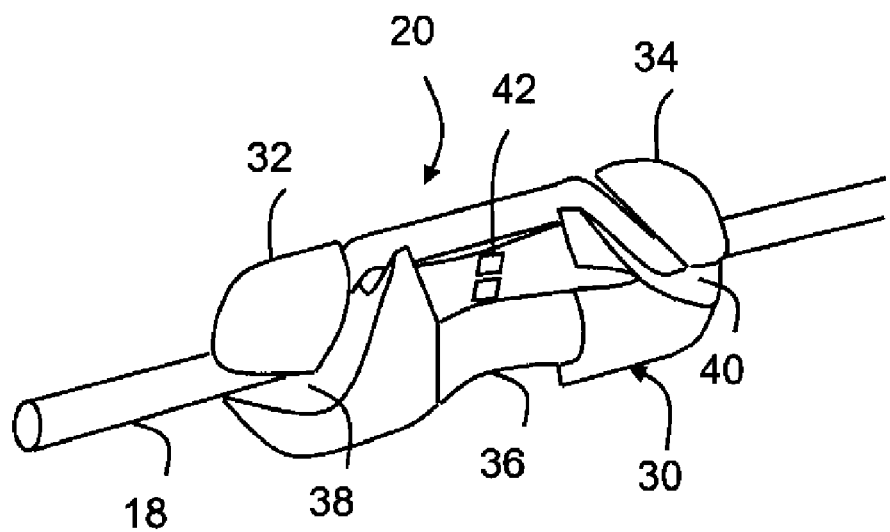
FIG. 2 is a perspective view of the tendon tension sensor shown in FIG. 1 separated from the robotic arm.

FIG. 2 is a perspective view of the tendon tension sensor 20 removed from the robotic arm 10. The tension sensor 20 includes an elastic body or element 30 having end portions 32 and 34 coupled together by a narrowed center portion 36. The end portion 32 includes a curved channel 38 and the end portion 34 includes a curved channel 40 through which the tendon 18 is threaded or passed so that it extends along the center portion 36, as shown. Thus, a pulling action or force on the tendon 18 causes the center portion 36 to bend or flex as a result of the tendon 18 being threaded through the channels 38 and 40 in the curved manner. Strain gauges 42 are mounted to opposing sides of the center portion 36, and can measure the bending of the element 30 to provide an indication of the tension force on the tendon 18.

In this non-limiting embodiment, the elastic element 30 is a single piece member that has a generally rounded configuration that makes it conducive to more easily fit in the robotic arm 10. Further, the elastic element 30 can be made of any material suitable for the purposes described herein that can be easily molded or machined, stands up to repeated bending force and is inexpensive. One suitable example for this material is aluminum.

Figure 3:
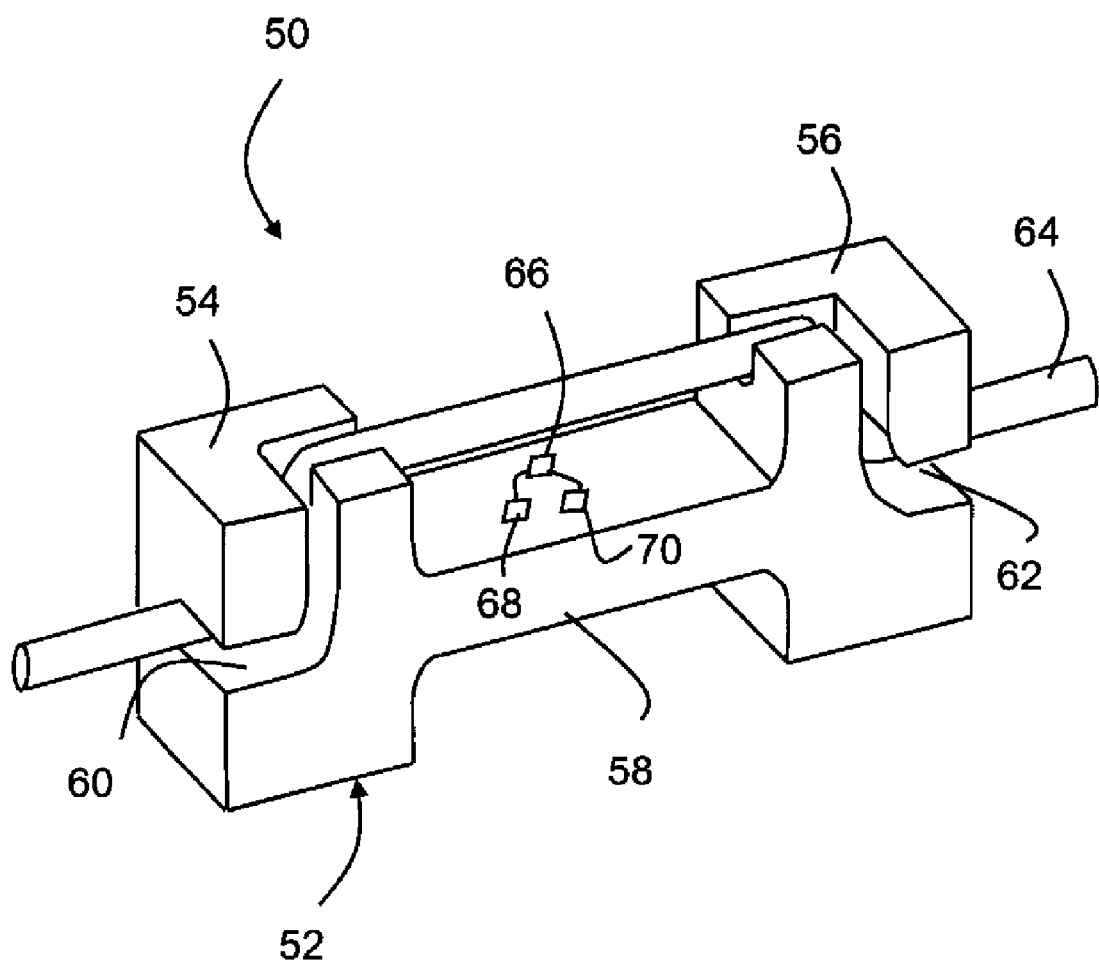
FIG. 3 is a perspective view of a tendon tension sensor similar to the tendon tension sensor shown in FIG. 2.

FIG. 3 is a perspective view of a tendon tension sensor 50, according to another embodiment. The tendon tension sensor 50 includes an elastic element 52 having end portions 54 and 56 including curved channels 60 and 62, respectively, through which a tendon 64 is threaded or passed. In this embodiment, the elastic element 52 has a general square configuration and can also be a single piece element. The elastic element 52 also includes a narrow center portion 58 that is connected to and separates the end portions 54 and 56 where the tendon 64 extends along the center portion 58. A top strain gauge 66 is mounted to the center portion 58 and is electrically coupled to top contacts 68 and 70 on a top surface of the center portion 58 adjacent to the tendon 62. As above, tension on the tendon 64 causes the center portion 58 to flex, which can be measured by the strain gauge 66. In one non-limiting embodiment, the elastic element 52 is about 1 inch in length, about a quarter inch in height and about a quarter inch in width.

Figure 4A:
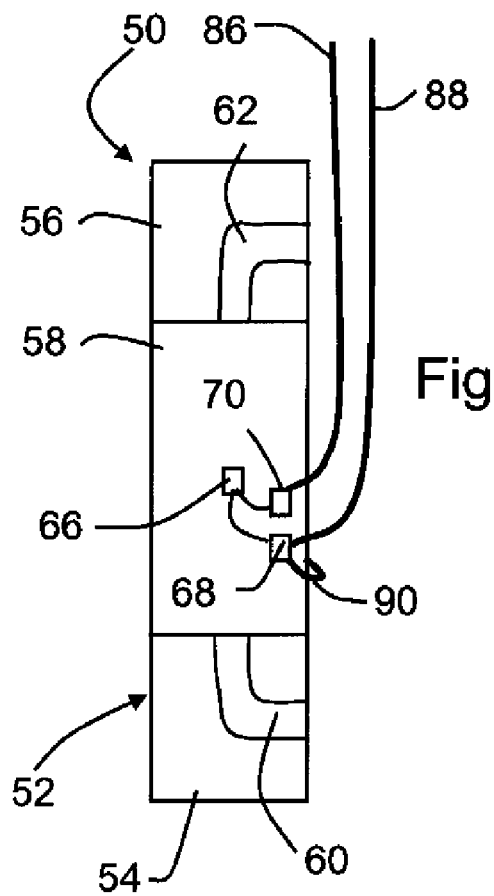
FIGS. 4(a)-4(c) show a top view, a side view and a bottom view, respectively, of an elastic element for the tendon tension sensor shown in FIG. 3.
Figure 4B:
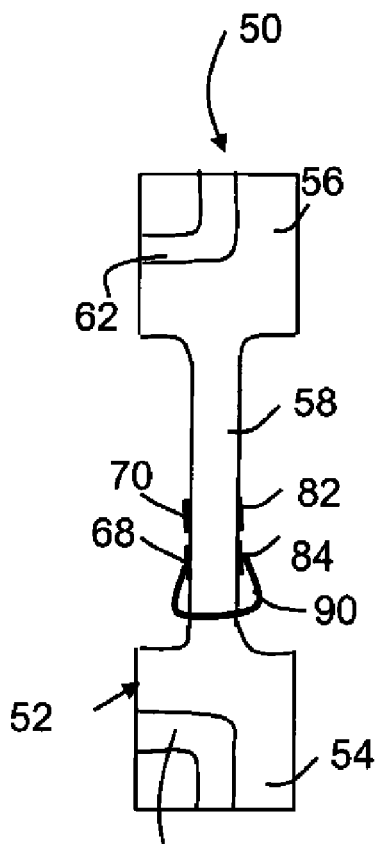
Figure 4C:
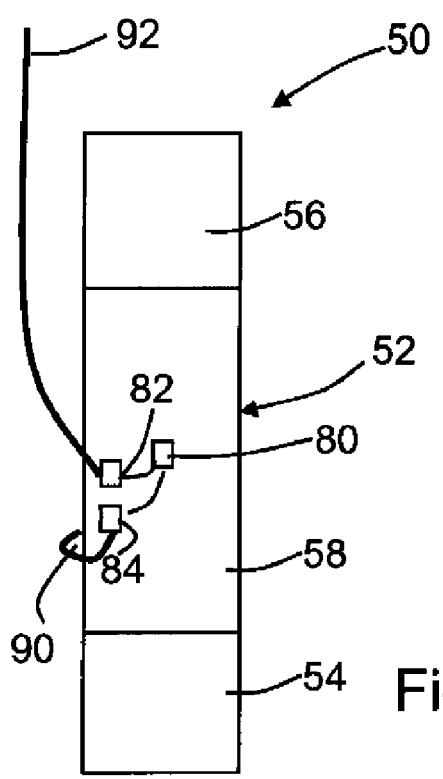

FIGS. 4(a)-4(c) are a top view, a side view and a bottom view, respectively, of the elastic element 52. The top view of the elastic element 52 shows the strain gauge 66 and the bottom view of the elastic element 52 shows another strain gauge 80 including contacts 82 and 84. Wires 86 and 88 are electrically coupled to the contacts 68 and 70, respectively, a wire 92 is electrically coupled to the contact 82 and a wire 90 is electrically coupled to the contacts 68 and 84. Thus, the measurements provided by the strain gauges 66 and 80 can be output to a controller (not shown) that controls the operation of the robotic arm 10.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tendon tension sensor comprising:
    a first end portion including a first curved channel;
    a second end portion including a second curved channel;
    a narrow center portion coupled to and between the first and second end portions; and
    at least one strain gauge mounted to the center portion, wherein the first and second curved channels are operable to accept a continuous length of a tendon such that tension on the tendon causes the center portion to flex which can be measured by the at least one strain gauge.

2. The tension sensor according to claim 1 wherein the first and second end portions have a general rounded configuration.

3. The tension sensor according to claim 1 wherein the first and second end portions have a general square configuration.

4. The tension sensor according to claim 1 wherein the at least one strain gauge is a first strain gauge mounted on one side of the center portion and a second strain gauge mounted on an opposite side of the center portion.

5. The tension sensor according to claim 1 wherein the first and second end portions and the center portion form a single piece elastic element.

6. The tension sensor according to claim 5 wherein the single piece elastic element is an aluminum element.

7. The tension sensor according to claim 1 wherein the tension sensor has a length of about 1 inch, a width of about one quarter of an inch and a height of about one quarter of an inch.

8. The tension sensor according to claim 1 wherein the tension sensor measures the tension on a tendon within a robotic arm.

9. The tension sensor according to claim 8 wherein the tendon controls a grasping force of a finger of the robotic arm.

10. A tendon tension sensor comprising:
    a single piece elastic element a first end portion including the first curved channel, a second end portion including a second curved channel and a narrowed middle portion coupled and between the first and second end portions; and
    a first strain gauge mounted to one surface of the center portion and a second strain gauge mounted to an opposing surface of the center portion, wherein the first and second curved channels accept a continuous length of a tendon such that tension on the tendon causes the center portion to flex which can be measured by the first and second strain gauges.

11. The tension sensor according to claim 10 wherein the first and second end portions have a general rounded configuration.

12. The tension sensor according to claim 10 wherein the first and second end portions have a general square configuration.

13. The tension sensor according to claim 10 wherein the single piece elastic element is an aluminum element.

14. The tension sensor according to claim 10 wherein the tension sensor has a length of about 1 inch, a width of about one quarter of an inch and a height of about one quarter of an inch.

15. The tension sensor according to claim 10 wherein the tension sensor measures the tension on a tendon within a robotic arm.

16. The tension sensor according to claim 15 wherein the tendon controls a grasping force of a finger of the robotic arm.

17. A tendon tension sensor for measuring the tension on a tendon that controls a grasping force of a finger in a robotic arm, said tension sensor comprising:
    an elastic element including a generally rounded first end portion including a first curved channel, a generally rounded second end portion including a second curved channel and a narrowed center portion coupled to and between the first and second end portions; and
    at least one strain gauge mounted to the center portion, wherein the tendon is threaded through the first and second curved channels such that tension on the tendon causes the center portion to flex which can be measured by the at least one strain gauge.

18. The tension sensor according to claim 17 wherein the at least one strain gauge is a first strain gauge mounted on one side of the center portion and a second strain gauge mounted on an opposite side of the center portion.

19. The tension sensor according to claim 17 wherein the elastic element is an aluminum element.

20. The tension sensor according to claim 17 wherein the tension sensor has a length of about 1 inch, a width of about one quarter of an inch and a height of about one quarter of an inch.

* * * * *